(12) United States Patent
Clifton et al.

(10) Patent No.: US 12,365,533 B2
(45) Date of Patent: *Jul. 22, 2025

(54) OPERATIONAL MODES FOR A REFUSE VEHICLE

(71) Applicant: Oshkosh Corporation, Oshkosh, WI (US)

(72) Inventors: Cody D. Clifton, Mapleton, MN (US); Jerry Shirley, Oshkosh, WI (US); Joshua D. Rocholl, Rochester, MN (US); Zhenyi Wei, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 371 days.

This patent is subject to a terminal disclaimer.

(21) Appl. No.: 17/872,535

(22) Filed: Jul. 25, 2022

(65) Prior Publication Data

US 2023/0023747 A1    Jan. 26, 2023

Related U.S. Application Data

(60) Provisional application No. 63/225,615, filed on Jul. 26, 2021.

(51) Int. Cl.
*G06F 3/04847* (2022.01)
*B65F 3/02* (2006.01)
(Continued)

(52) U.S. Cl.
CPC ........ *B65F 3/02* (2013.01); *B65F 2003/0226* (2013.01); *B65F 2003/023* (2013.01);
(Continued)

(58) Field of Classification Search
CPC ................ B65F 3/02; B65F 2003/0226; B65F 2003/023; B65F 2003/0279; B65F 3/06;
(Continued)

(56) References Cited

U.S. PATENT DOCUMENTS

| 5,762,461 A * | 6/1998 | Frohlingsdorf ........... B65F 3/00 414/408 |
| 9,403,278 B1 * | 8/2016 | Van Kampen ......... B25J 9/1612 |

(Continued)

FOREIGN PATENT DOCUMENTS

| CN | 212767879 U * | 3/2021 | ................ B65F 3/00 |
| DE | 4340773 A1 * | 7/1994 | ............ B65F 1/1484 |

(Continued)

OTHER PUBLICATIONS

Service Shack—How to Operate and Calibrate the Heil® Half/Pack® H.A.L.O. Semi-Autonomous Controls, Oct. 25, 2019, retrieved from—https://vimeo.com/368781120, 3 pages (Year: 2019).*

*Primary Examiner* — Yongjia Pan
(74) *Attorney, Agent, or Firm* — Foley & Lardner LLP

(57) ABSTRACT

A refuse vehicle has a chassis supporting a plurality of wheels, as well as a motor. A vehicle body is also supported by the chassis and defines a receptacle for storing refuse. A lifting system is coupled to the vehicle body and is movable between a first position and a second position vertically offset from the first position using a hydraulic system. The refuse vehicle also has a processing unit in communication with the lifting system and the motor. The processing unit is configured to access and execute a plurality of preset operational modes stored within a memory to adjust performance parameters of the refuse vehicle. The operational modes include at least two different operational modes corresponding to different route types.

16 Claims, 8 Drawing Sheets

(51) Int. Cl.
*G06F 3/04842* (2022.01)
*G06F 3/0488* (2022.01)

(52) U.S. Cl.
CPC .. *B65F 2003/0279* (2013.01); *G06F 3/04847* (2013.01); *G06F 3/0488* (2013.01)

(58) Field of Classification Search
CPC ...... B65F 2003/0259; B65F 2003/0263; G06F 3/04847; G06F 3/0488; G06F 3/0482; G06F 3/04842
See application file for complete search history.

(56) References Cited

U.S. PATENT DOCUMENTS

| | | | |
|---|---|---|---|
| 11,208,262 B2* | 12/2021 | Lewis | B65F 3/048 |
| 11,407,585 B2* | 8/2022 | Whitfield, Jr. | B65F 3/041 |
| 11,453,550 B2* | 9/2022 | Maroney | B25J 13/088 |
| 2017/0361491 A1 | 12/2017 | Datema et al. | |
| 2017/0369242 A1* | 12/2017 | McNeilus | B65F 3/046 |
| 2018/0250847 A1 | 9/2018 | Wurtz et al. | |
| 2018/0346241 A1* | 12/2018 | Errington | B65F 3/04 |
| 2019/0091890 A1 | 3/2019 | Rocholl et al. | |
| 2019/0121353 A1 | 4/2019 | Datema et al. | |
| 2019/0137595 A1* | 5/2019 | Choi | H04W 4/40 |
| 2019/0193934 A1 | 6/2019 | Rocholl et al. | |
| 2019/0325220 A1 | 10/2019 | Wildgrube et al. | |
| 2019/0344475 A1 | 11/2019 | Datema et al. | |
| 2020/0078986 A1 | 3/2020 | Clifton et al. | |
| 2020/0230841 A1 | 7/2020 | Datema et al. | |
| 2020/0230842 A1 | 7/2020 | Datema et al. | |
| 2020/0262366 A1 | 8/2020 | Wildgrube et al. | |
| 2020/0265656 A1 | 8/2020 | Koga et al. | |
| 2020/0339346 A1* | 10/2020 | Maroney | B25J 5/06 |
| 2020/0339347 A1* | 10/2020 | Williams | B65F 3/043 |
| 2020/0342240 A1* | 10/2020 | Szoke-Sieswerda | B65F 3/041 |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346657 A1 | 11/2020 | Clifton et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0348681 A1 | 11/2020 | Clifton et al. | |
| 2020/0348764 A1 | 11/2020 | Clifton et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0398772 A1 | 12/2020 | Wildgrube et al. | |
| 2020/0398857 A1 | 12/2020 | Clifton et al. | |
| 2020/0399057 A1 | 12/2020 | Rocholl et al. | |
| 2020/0399058 A1 | 12/2020 | Rocholl et al. | |
| 2020/0401807 A1 | 12/2020 | Wildgrube et al. | |
| 2020/0402325 A1 | 12/2020 | Koga et al. | |
| 2021/0031611 A1 | 2/2021 | Yakes et al. | |
| 2021/0031612 A1 | 2/2021 | Yakes et al. | |
| 2021/0069934 A1 | 3/2021 | Rocholl et al. | |
| 2021/0124347 A1 | 4/2021 | Datema et al. | |
| 2021/0162630 A1 | 6/2021 | Clifton et al. | |
| 2021/0221216 A1 | 7/2021 | Yakes et al. | |
| 2021/0225095 A1 | 7/2021 | Koga et al. | |
| 2021/0229320 A1 | 7/2021 | Datema et al. | |
| 2021/0229908 A1 | 7/2021 | Rocholl et al. | |
| 2021/0252995 A1 | 8/2021 | Rocholl et al. | |
| 2021/0271884 A1 | 9/2021 | Wildgrube et al. | |
| 2021/0316740 A1 | 10/2021 | Clifton et al. | |
| 2021/0316741 A1 | 10/2021 | Clifton et al. | |
| 2021/0323436 A1 | 10/2021 | Rocholl et al. | |
| 2021/0323437 A1 | 10/2021 | Rocholl et al. | |
| 2021/0323438 A1 | 10/2021 | Rocholl et al. | |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0325529 A1 | 10/2021 | Koga et al. | |
| 2021/0325911 A1 | 10/2021 | Koga et al. | |
| 2021/0327164 A1 | 10/2021 | Koga et al. | |
| 2021/0327170 A1 | 10/2021 | Rocholl et al. | |
| 2021/0327237 A1 | 10/2021 | Rocholl et al. | |
| 2021/0331635 A1 | 10/2021 | Wildgrube et al. | |
| 2021/0331636 A1 | 10/2021 | Wildgrube et al. | |
| 2021/0331637 A1 | 10/2021 | Wildgrube et al. | |
| 2021/0339632 A1 | 11/2021 | Rocholl et al. | |
| 2021/0339648 A1 | 11/2021 | Koga et al. | |
| 2021/0339949 A1 | 11/2021 | Rocholl et al. | |
| 2021/0345062 A1 | 11/2021 | Koga et al. | |
| 2021/0373560 A1 | 12/2021 | Koga et al. | |
| 2021/0394394 A1 | 12/2021 | Datema et al. | |
| 2021/0396251 A1 | 12/2021 | Clifton et al. | |
| 2021/0407222 A1 | 12/2021 | Koga et al. | |
| 2022/0009338 A1 | 1/2022 | Yakes et al. | |
| 2022/0033181 A1 | 2/2022 | Koga et al. | |
| 2022/0063738 A1 | 3/2022 | Nelson et al. | |
| 2022/0096884 A1 | 3/2022 | Koga et al. | |
| 2022/0097527 A1 | 3/2022 | Koga et al. | |
| 2022/0097555 A1 | 3/2022 | Koga et al. | |
| 2022/0097556 A1 | 3/2022 | Koga et al. | |
| 2022/0097633 A1 | 3/2022 | Koga et al. | |
| 2022/0097961 A1 | 3/2022 | Koga et al. | |
| 2022/0097962 A1 | 3/2022 | Koga et al. | |
| 2022/0097963 A1 | 3/2022 | Koga et al. | |
| 2022/0097964 A1 | 3/2022 | Koga et al. | |
| 2022/0099723 A1 | 3/2022 | Koga et al. | |
| 2022/0105827 A1 | 4/2022 | Rocholl et al. | |
| 2022/0106114 A1 | 4/2022 | Buege et al. | |
| 2022/0106115 A1 | 4/2022 | Buege et al. | |
| 2022/0111559 A1 | 4/2022 | Wurtz et al. | |
| 2022/0118854 A1 | 4/2022 | Davis et al. | |
| 2022/0169444 A1 | 6/2022 | Rocholl et al. | |
| 2022/0185582 A1 | 6/2022 | Koga et al. | |
| 2022/0258965 A1 | 8/2022 | Kappers et al. | |
| 2022/0258967 A1 | 8/2022 | Kappers et al. | |
| 2022/0267090 A1 | 8/2022 | Rocholl et al. | |
| 2022/0307312 A1 | 9/2022 | Rocholl et al. | |

FOREIGN PATENT DOCUMENTS

| | | | | |
|---|---|---|---|---|
| DE | 102018216947 A1 | * | 4/2020 | ...... B60W 30/18027 |
| ES | 2560978 A1 | * | 2/2016 | ............ B65F 3/041 |
| JP | H09208199 A | * | 9/1997 | ................ B66F 9/24 |

* cited by examiner

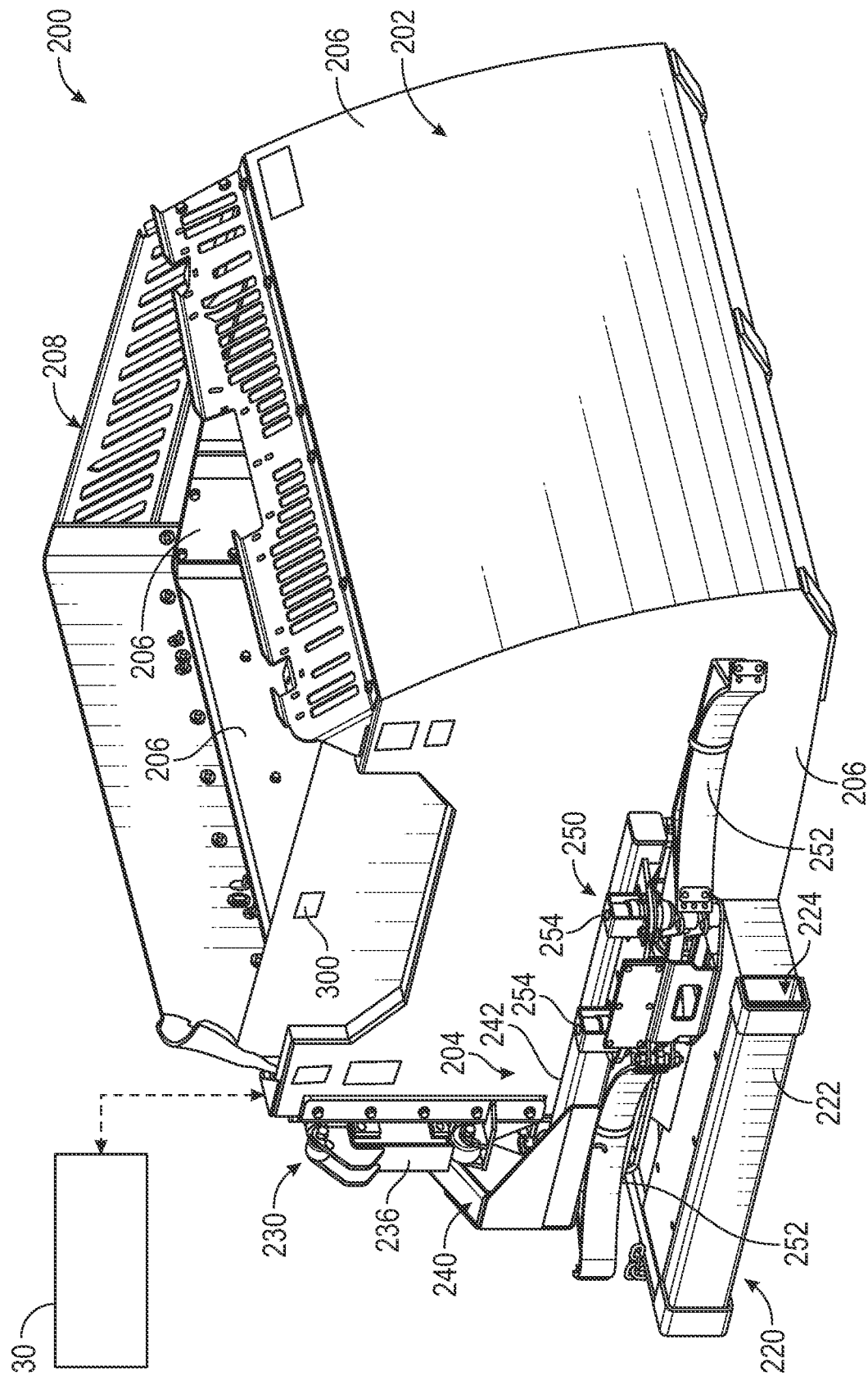

OPERATIONAL MODES FOR A REFUSE VEHICLE

CROSS-REFERENCE TO RELATED PATENT APPLICATIONS

This application claims the benefit of and priority to U.S. Provisional Patent Application No. 63/225,615, filed Jul. 26, 2021, which is incorporated herein by reference in its entirety.

BACKGROUND

Refuse vehicles have many different uses, configurations, and applications. Vehicle operators can perform a variety of different tasks using different controls on the vehicle. Because refuse vehicles are designed to accomplish many different tasks, certain components on the vehicle may be useful in performing some operations, but not helpful for performing others.

SUMMARY

One exemplary embodiment relates to a refuse vehicle. The refuse vehicle has a chassis supporting a plurality of wheels, a motor supported by the chassis, a vehicle body, a lifting system, a processing unit, and a human machine interface. The vehicle body is supported by the chassis and defines a receptacle for storing and transporting refuse. The lifting system (e.g., a hydraulic arm assembly) is movable between a first position (e.g., stowed and lowered) and a second position (e.g., deployed and raised) vertically offset from the first position using a hydraulic system. The processing unit is in communication with the lifting system and the motor and is configured to access and execute a plurality of different preset operational modes stored within a memory to adjust performance parameters of at least one of the motor and hydraulic system. The operational modes include at least two different operational modes corresponding to different route types. The human machine interface is in communication with the processing unit and includes a plurality of inputs. At least two of the plurality of inputs correspond to two different preset operational modes. Upon receiving a selection of one of the plurality of inputs on the human machine interface, the processing unit adjusts the performance parameters of at least one of the motor and the hydraulic system to values associated with the preset operational mode associated with the at least one of the plurality of inputs selected.

Another exemplary embodiment relates to a refuse vehicle. The refuse vehicle includes a chassis, a motor, a vehicle body, a lifting system, and a processing unit. The chassis supports a plurality of wheels, as well as the motor. The vehicle body is also supported by the chassis, and defines a receptacle for storing and transporting refuse. The lifting system is movable between a first position and a second position vertically offset from the first position using a hydraulic system (e.g., a hydraulic pump, etc.). The processing unit is in communication with the lifting system and the motor and is configured to access and execute a plurality of preset operational modes stored within a memory to adjust performance parameters of at least one of the motor and the hydraulic system. The operational modes include at least two different operational modes corresponding to different route types. The processing unit accesses and executes one of the plurality of preset operational modes in response to receiving a selection corresponding with the route type. Upon receiving the selection with the route type, the processing unit adjusts the performance parameters of at least one of the motor and the hydraulic system to values associated with the preset operational mode associated with the route type.

Another exemplary embodiment relates to a method of controlling a refuse vehicle. The method includes receiving a selection of a preset operational mode of the refuse vehicle. The selection of the preset operational mode corresponds with a route type the refuse vehicle is performing. The method further includes accessing a memory with a processing unit to retrieve preset performance parameters of the refuse vehicle associated with the selected preset operational mode of the refuse vehicle. The performance parameters include at least an output of a hydraulic pump within the hydraulic system. The processing unit is in communication with both the hydraulic system and a motor of the refuse vehicle. The method then includes adjusting current performance parameters of the refuse vehicle toward the preset performance parameters associated with the selected preset operational mode of the refuse vehicle corresponding with the route type the refuse vehicle is performing.

Another exemplary embodiment relates to a refuse vehicle. The refuse vehicle includes a chassis supporting a plurality of wheels, a vehicle body supported by the chassis and defining a receptacle for storing refuse therein, a lifting system, a processing unit, and a human machine interface. The lifting system is configured to engage and lift refuse containers to transfer refuse within the refuse containers into the receptacle. The lifting system is operated with a hydraulic system. The processing unit is in communication with the lifting system and is configured to access and execute a plurality of preset operational modes stored within a memory to adjust performance parameters of the lifting system. The preset operational modes includes at least two different operational modes corresponding to different route types. The human machine interface is in communication with the processing unit and includes a plurality of inputs. At least two of the plurality of inputs correspond to the two different preset operational modes. Upon receiving a selection of one of the plurality of inputs on the human machine interface, the processing unit adjusts the performance parameters of the lifting system toward values associated with a preset operational mode that is associated with the at least one of the plurality of inputs selected.

Another exemplary embodiment relates to a refuse vehicle. The refuse vehicle includes a chassis supporting a plurality of wheels, a vehicle body supported by the chassis and defining a receptacle for storing refuse therein, a lifting system, and a processing unit. The lifting system is configured to engage and lift refuse containers to transfer refuse within the refuse containers into the receptacle. The processing unit is in communication with the lifting system and is configured to access and execute a plurality of preset operational modes stored within a memory to adjust performance parameters of the lifting system. The operational modes include at least two different operational modes corresponding to different route types. In response to receiving a selection corresponding with the route type, the processing unit is configured to access one of the plurality of preset operational modes and to adjust the performance parameters of the lifting system toward values associated with the preset operational mode associated with the route type.

Another exemplary embodiment relates to a refuse vehicle. The refuse vehicle includes a chassis, a vehicle body supported by the chassis and defining a receptacle for storing refuse therein, a hydraulically-driven lifting system, and a processing unit. The hydraulically-driven lifting system is configured to engage and a lift waste container to transfer refuse within the waste container into the receptacle. The processing unit is in communication with the hydraulically-driven lifting system and is configured to access and execute a plurality of preset operational modes stored within a memory to adjust performance of the hydraulically-driven lift system based upon a selection corresponding to a refuse type.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 8 is a perspective view of the carry can assembly of FIG. 7, shown in additional detail.

DETAILED DESCRIPTION

Figure 1:
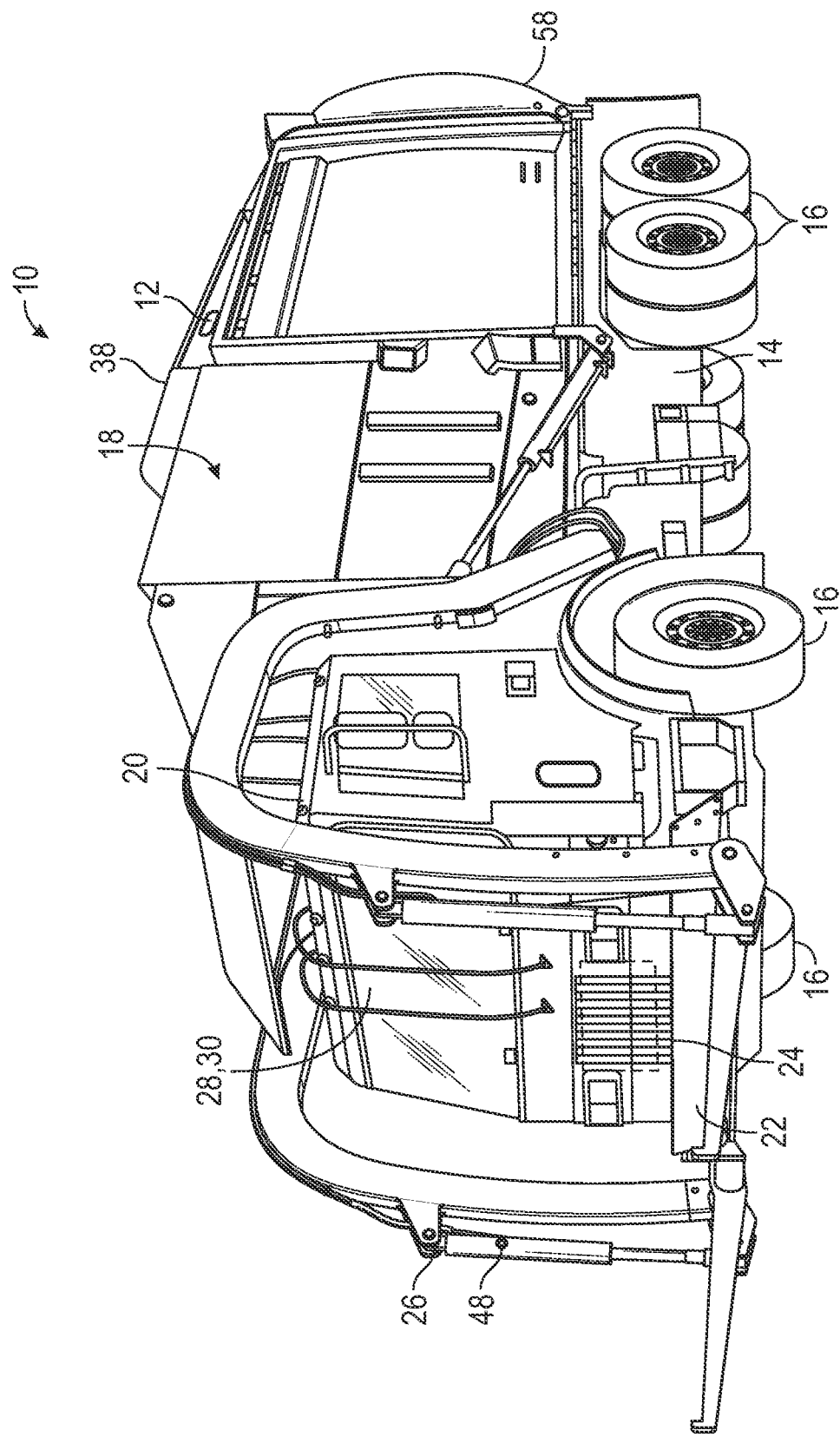
FIG. 1 is a perspective view of a refuse vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for controlling a refuse vehicle, such as a front loader, side loader, or rear loader. Specifically, refuse vehicles can be controlled using a variety of different and selectable preset operational modes that are optimized to help a refuse vehicle perform different tasks more efficiently. Different operational modes can be assigned depending on the type of collection route (e.g., recycling or garbage, residential or commercial), type of fuel source being used (e.g., diesel fuel or compressed natural gas), type of refuse being collected, ambient outdoor temperature, or the presence of another implement (e.g., equipment coupled to a PTO shaft, carry can), for example. The different selectable operational modes each provide set values for performance parameters of the vehicle that can be chosen to more effectively carry out different tasks that may be assigned to a refuse vehicle. Different operational modes may be best achieved using different motor requirements, lifting system requirements, on-board compactor requirements, or other sub-system adjustments that can be executed by a processing system to ensure a more streamlined completion of a desired task. The different operational modes can be optimized or otherwise chosen to provide efficient and effective operation of the vehicle.

The different operational modes can include specific and tailored control of the lifting system that is used to interact with waste receptacles. For example, in refuse vehicles that include grabber mechanisms (e.g., side loading refuse trucks), different operational modes can correspond with different grabber operational characteristics, like grip strength, waste receptacle compression, grabber positioning, and other parameters. Accordingly, the lifting system can be optimized to grab and secure differently-sized waste receptacles in a way that avoids damage to the waste receptacle, yet still permits effective refuse removal. Because different refuse types may correspond with different types of waste receptacles (e.g., polymeric v. metallic, etc.), providing specific grabber parameters based on refuse type can help to optimize performance of the refuse vehicle.

The different operational modes can be selected by a user, by an off-site fleet command center, or automatically implemented by an on-board processing unit and carried out through the completion of an assigned task. For example, an onboard global positioning system (GPS) can monitor the current location of the refuse vehicle and toggle through different operational modes depending on where the refuse vehicle is traveling. Each operational mode can be designed to reduce the amount of manual interaction between an operator and the refuse vehicle during operation, which may further limit mistakes and lost time during operation.

Figure 6:
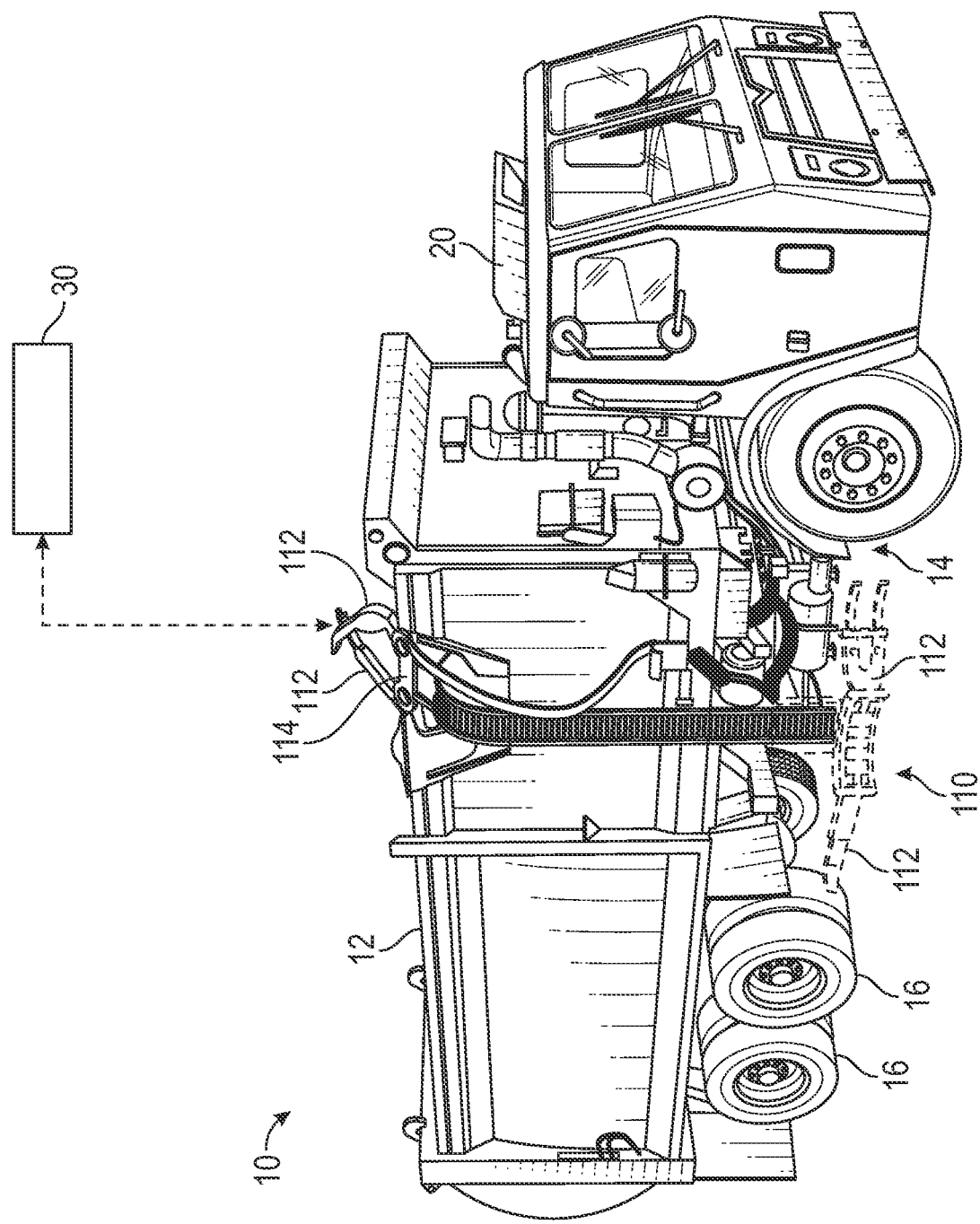
FIG. 6 is a perspective view of another refuse vehicle, according to an exemplary embodiment.

Referring to FIG. 1, a refuse vehicle 10 is adapted for retrieving and hauling refuse from waste containers. The refuse vehicle 10 is depicted as a front end loader 10, but can also take the form of a rear end loader or side loader (as shown in FIG. 6), for example, that is arranged to lift and transfer contents of a waste container into an on-board receptacle 12. The refuse vehicle 10 has a vehicle chassis 14 that generally supports wheels 16, a vehicle body 18, and the receptacle 12. The vehicle body 18 can include a cab 20 and a motor housing 22 that receives a motor 24. The motor 24 can produce rotational power that can then be transmitted to the wheels 16 through a transmission to drive the refuse vehicle 10.

The on-board receptacle 12 can be sized to receive the contents of several waste containers (e.g., dumpsters, bins, refuse containers, etc.) so that the refuse vehicle 10 can execute an extended route that includes several stops. Upon arriving at each site, a lifting system 26 (e.g., a hydraulic arm assembly 110) can engage and raise a waste container until an opening of the waste container is inverted or angled downward toward the on-board receptacle 12. Aided by gravity, waste falls out of the opening of the waste container and into the on-board receptacle 12. The waste container can then be lowered to the ground and disengaged from the lifting system 26 so that the refuse vehicle 10 can drive to another location along its route and repeat the waste removal process.

A control system 28 can be positioned within the cab 20 of the vehicle 10, for example, to aid a driver in performing different vehicle tasks. The control system 28 can provide operating instructions to various vehicle subsystems 44, including a steering system, the lifting system 26, a waste compactor 46 (shown in FIG. 5) present within the on-board receptacle 12, a power take-off (PTO) shaft, the motor 24, cab climate controls, accessories (e.g., a carry can assembly 200, shown in FIGS. 7-8) and/or other adjustable systems aboard or coupled with the refuse vehicle 10. A processing unit 30 can issue instructions or commands to each system within the vehicle 10 to execute desired vehicle functions.

With additional reference to FIGS. 2-5, an operator can interact with the control system 28 through a display 32 in communication with the processing unit 30. The display 32 can present a graphical user interface (GUI) 34 that allows a user to monitor operational parameters of the vehicle 10 as well as input commands to the various vehicle subsystems 44. The display 32 can be a touch screen display or can be accompanied by a plurality of inputs (e.g., buttons, joysticks) that can be used to toggle through and select a desired input 42 on the GUI 34.

Using the control system 28 and processing unit 30, the refuse vehicle 10 can be operated in different preset operation modes to more efficiently complete different tasks that may be assigned to the refuse vehicle 10. Each operation mode can include a series of stored system configurations or performance parameters that are optimized for the specific vehicle or the specific task to be performed. The preset operation mode and associated performance parameters can be stored within and accessed from a memory 36 (e.g., local or remote) that is in communication with the processing unit 30.

Figure 2:
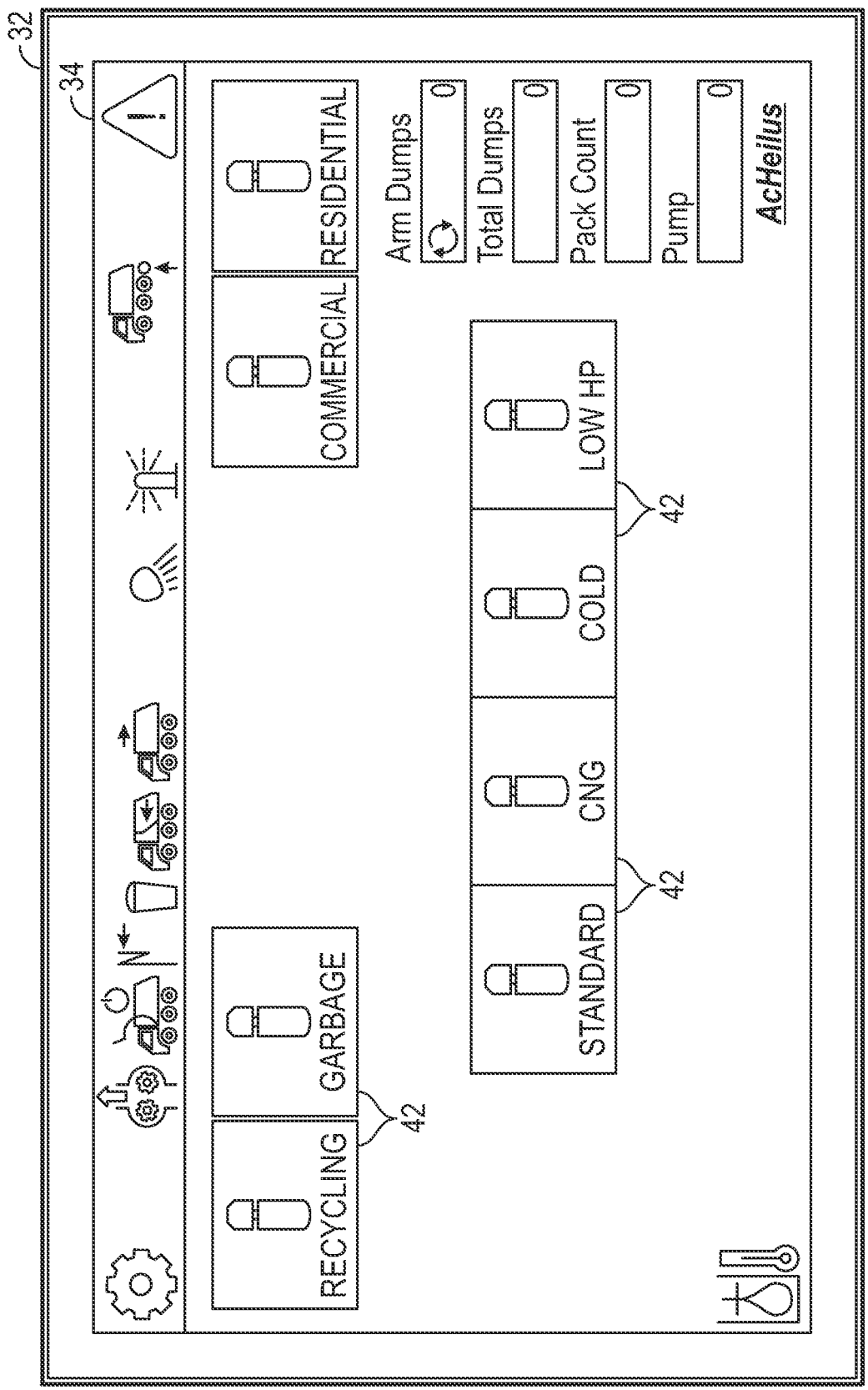
FIG. 2 is a pictorial view of a user interface that can be presented on a display of the refuse vehicle of FIG. 1, depicting several selectable operational mode presets.
Figure 3A:
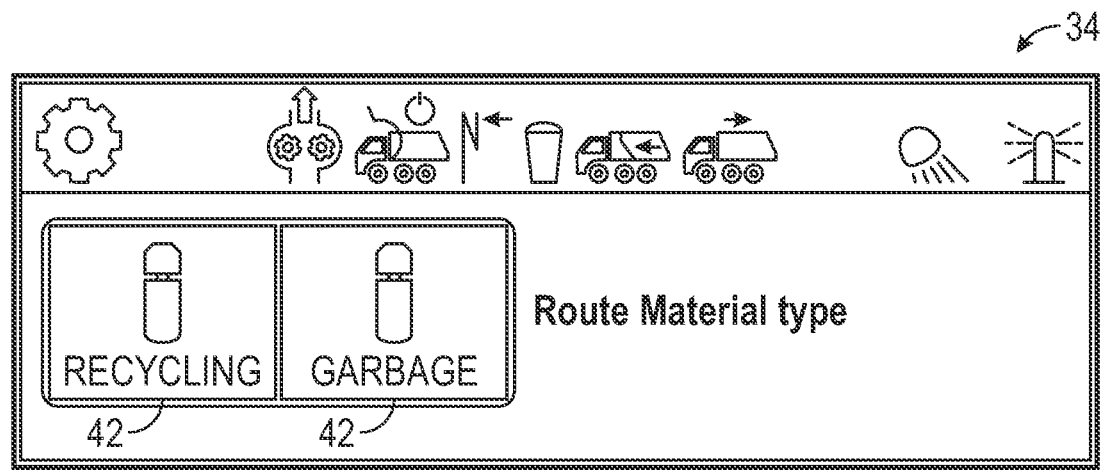
FIG. 3A is a detail view of the graphical user interface of FIG. 2, depicting exemplary operational presets related to materials.

The same refuse vehicle 10 may be used to collect and transport different types of waste or refuse, and the preferred collection process may vary by waste type. As shown in FIGS. 2 and 3A, the same refuse vehicle 10 may be used to handle either recycling or garbage, and the preferred operational mode changes depending on the selection. Before beginning a route or driving the refuse vehicle 10, a user may first be prompted by the GUI 34 to select the type of waste to be collected. Using inputs in communication with the display 32 or the display itself (e.g., a touch screen display), a vehicle operator can then select an icon on the GUI 34 that represents the proper waste material type. Alternatively, the type of waste to be collected can be determined automatically based upon the day of refuse vehicle 10 operation (e.g., if there are designated recycling and garbage collection days). In some embodiments, the type of waste to be collected can be input remotely from a fleet command center 56 or network computer in communication with the control system 28 of the refuse vehicle 10. In other examples, the type of material being collected can be determined based upon characteristics (e.g., size, color, shape) of the waste container being accessed, determined by a sensor 48.

Selecting the "garbage" input or the "recycling" input (or another type of waste input, such as organic material) from the GUI 34 adjusts the operation mode of the refuse vehicle 10 to effectively deal with each different type of waste properly. If the recycling input is selected on the GUI 34, the processing unit 30 can access a memory 36 storing specific performance parameters preset for performing a recycling route. For example, the rate at which a compactor 46 or packer within the on-board receptacle 12 operates can be included within the performance parameters associated with the recycling operation mode. Recycling materials are generally lightweight and loosely packed (or entirely unpacked) materials and are advantageously compacted frequently to improve the overall capacity of the on-board receptacle 12 on the vehicle 10, so the rate at which the packer operates can be increased in the recycling operation mode. The position and control mechanism of a top door 38 of the on-bard receptacle 12 can be adjusted based upon the selected operation mode as well. Because recycling materials may be light-weight (e.g., cardboard), the recycling materials are often prone to blowing out of the on-board receptacle 12. To contain the collected waste material, the recycling operation mode can include executable instructions that control the processing unit 30 to close the top door 38 at all times when the vehicle 10 is traveling. In some examples, the processing unit 30 controls the top door 38 to be closed whenever the transmission is in gear (e.g., a clutch of the refuse vehicle 10 is engaged to move the vehicle forward or in reverse). The top door 38 can be further configured to automatically open whenever the arm or forks of the lifting system 26 are moved. Allowable capacity for the on-board receptacle 12 can be stored within the performance parameters as well, as recyclable material may be packed against the top door 38 without a significant risk of damage to the vehicle 10.

Selecting the "garbage" input or the "recycling" input (or other suitable waste type input) from the GUI 34 or other selection methods can also adjust operation of the lifting system 26. For example, and as shown in FIG. 6, the lifting system can be a hydraulic arm assembly 110. The hydraulic arm assembly 110 includes a set of rotatable jaws 112 that can move relative to a carriage assembly 114 to engage waste receptacles. Because the type of waste receptacle may differ depending upon the waste type (e.g., garbage v. recycling), different clamping force values can be associated with the different operational modes, and can be executed by the processing unit 30. For example, garbage containers may be presumed to be more robust than recycling containers (e.g., garbage containers may be made from a metallic material, while recycling bins may be made from a polymeric material), such that the garbage containers may withstand additional clamping force. Accordingly, the preset operational mode for "garbage" can also include instructions to produce a clamping force on the receptacles that is approximately two times greater than the clamping force associated with the "recycling mode." In some examples, the size of recycling containers may vary from garbage containers. Accordingly, the jaws 112 can be configured to close to a specific and predetermined distance in the "garbage" mode that is different than the "recycling" mode so as to accommodate the differently-sized receptacles.

Selecting the garbage input on the GUI 34 optimizes the vehicle 10 to pick up and transport garbage. Performance parameters including the packer (compactor 46) frequency, packer force, and top door 38 operation can be adjusted upon selecting the garbage operation mode. In some examples, the packer frequency is reduced compared to the recycling mode. Additionally, the force supplied by the packer can be increased in order to better compact garbage received within the on-board receptacle 12. Finally, because garbage packing against the top door 38 can damage the top door 38, the garbage operation mode can include instructions to keep the top door 38 open at all times, regardless of whether the vehicle 10 is moving and regardless of whether the lifting system 26 is being moved. Each adjusted performance parameters can automate processes that may otherwise need to be performed manually by a user, which can help avoid any mistakes during operation due to improper operation or failure to perform certain tasks.

Figure 3B:
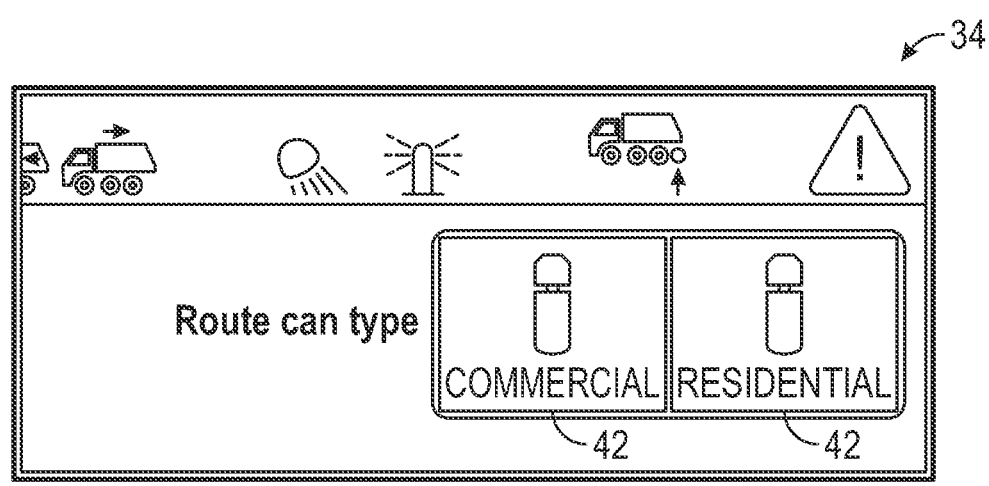
FIG. 3B is a detail view of the graphical user interface of FIG. 2, depicting exemplary operational presets related to refuse receptacle type.

Once a waste material operational mode has been selected on the GUI 34, an operator may be prompted to select a route type. For example, and as shown in FIGS. 2 and 3B, the GUI 34 may ask an operator to input whether the route will be commercial or residential. The route type may directly affect the quantity, weight, and types of waste collected, so different operational modes are assigned for each type of operation.

Selecting the "residential" icon from the GUI 34 can prompt the processing unit 30 to initiate the residential operation mode. Residential routes typically involve more frequent dumps of less weight, and performance parameters can be tailored to effectively deal with these constraints. For example, the packer cycling rate can be increased in the residential mode to capture the lightweight waste materials and continue pushing them backwards within the on-board receptacle 12. The type of operational mode selected can also determine how or when the packer operates. Because waste containers (e.g., garbage cans) along residential routes are typically positioned in close proximity, the vehicle 10 may need to make frequent stops to complete a route. Accordingly, the packer can be arranged to operate while the vehicle 10 is in gear (e.g., drive or reverse). In some embodiments, the packer may operate only when a service brake or work brake is being applied to the vehicle 10. To maximize efficiency along the residential route, the operator should stay in the cab 20 as much as possible. Various performance parameters of the vehicle can be tailored to encourage or incentivize the operator to remain within the cab 20 of the vehicle 10. For example, the lifting system 26 could be controlled only from within the cab 20 of the vehicle 10, or may require some authentication code or credential in order to operate the lifting system 26 externally. Additionally, the lifting system 26 could be configured to only interact with a certain size or color of waste container in the residential mode, as detected by a sensor 48 on the vehicle.

In some examples, the type of route also influences different operational parameters of the lifting system 26. For example, and as discussed above, the lifting system can be a hydraulic arm assembly 110. The type of route may accordingly influence a number of parameters of the hydraulic arm assembly 110, including the jaw 112 position, jaw gripping force, and carriage assembly 114 position, for example. Residential refuse receptacles are often formed of more economical and lightweight material, like plastic. Similarly, these residential refuse receptacles are often designed to be smaller, as they are typically associated with a single residence. Commercial refuse receptacles, in contrast, are often larger and more robust, and often made of heavier, metallic material (e.g., aluminum). Accordingly, commercial refuse receptacles are able to withstand more force from the jaws 112 of the hydraulic arm assembly 110. The processing unit 30 can accordingly execute different preset operational modes to adjust the operating parameters of the lifting system 26 based upon these different route types. The set of operating parameters associated with the residential mode for a residential route can include lighter jaw gripping forces, closer jaw positioning, and lower carriage assembly 114 positioning than the commercial operational mode for a commercial route.

While described as a hydraulic arm assembly 110, various other lifting systems 26 can be influenced by different operational modes. For example, if the refuse vehicle 10 is a front loading refuse vehicle, as depicted in FIG. 1, the lifting system 26 can include laterally and vertically adjustable forks 60. The forks 60 can be moved to different positions based upon the type of mode selected. For example, in the residential mode, the forks 60 can be positioned at a first distance apart from one another. In the commercial mode, the forks 60 can be positioned at a second distance apart from one another that is greater than the first distance, which can help to accommodate the larger and wider commercial refuse receptacles. The forks 60 can be automatically adjusted to their appropriate position by the processing unit 30 upon the selection of an operational mode.

If the "commercial" mode of operation is selected from the GUI 34, the processing unit 30 can retrieve a set of performance parameters that optimize the vehicle 10 to perform a typically more labor-intensive commercial route. Commercial waste containers are often more spread out, but each individual waste container may contain a larger volume of waste. Because the frequency of waste pickup is reduced, the packer within the on-board receptacle 12 may not need to operate at a high frequency. However, like in the garbage operation mode, the force at which the packer operates may preferably be increased to further compact the waste retrieved from each waste container along the route. Operators may need to get out of the cab 20 of the vehicle 10 to access and retrieve commercial waste containers from fenced areas or corrals, so the vehicle 10 may be parked periodically. The processing unit 30 can control the packer to operate when the vehicle 10 is in neutral, for example, and the parking brake is activated.

Selecting either of the residential or commercial routes can also prompt the processing unit 30 to begin measuring or recording data associated with the route. For example, the selection of a residential mode may then present a menu of stored past residential routes performed by the vehicle 10 (or a different vehicle within the fleet) on the GUI 34. The operator can select a route from the GUI 34 associated with the desired route (or choose to start a new route) and the display 32 can present a GPS map indicating the location of various stops along the route or a map, generally, of the surrounding area. As the vehicle 10 navigates the route and collects waste from each location, sensors 48 positioned throughout the vehicle 10 can record data. For example, sensors 48 positioned on the lifting system 26 can measure the weight of waste retrieved from each location. Once paired with a GPS coordinate, a customer at a specific address can be charged based upon the amount of waste collected at the site. For commercial routes, a customer could be charged based upon the amount of time spent at a location collecting waste materials. Additional data, including whether or not any waste containers were found present at a designated pickup location can be stored within the memory 36 as well.

Figure 3C:
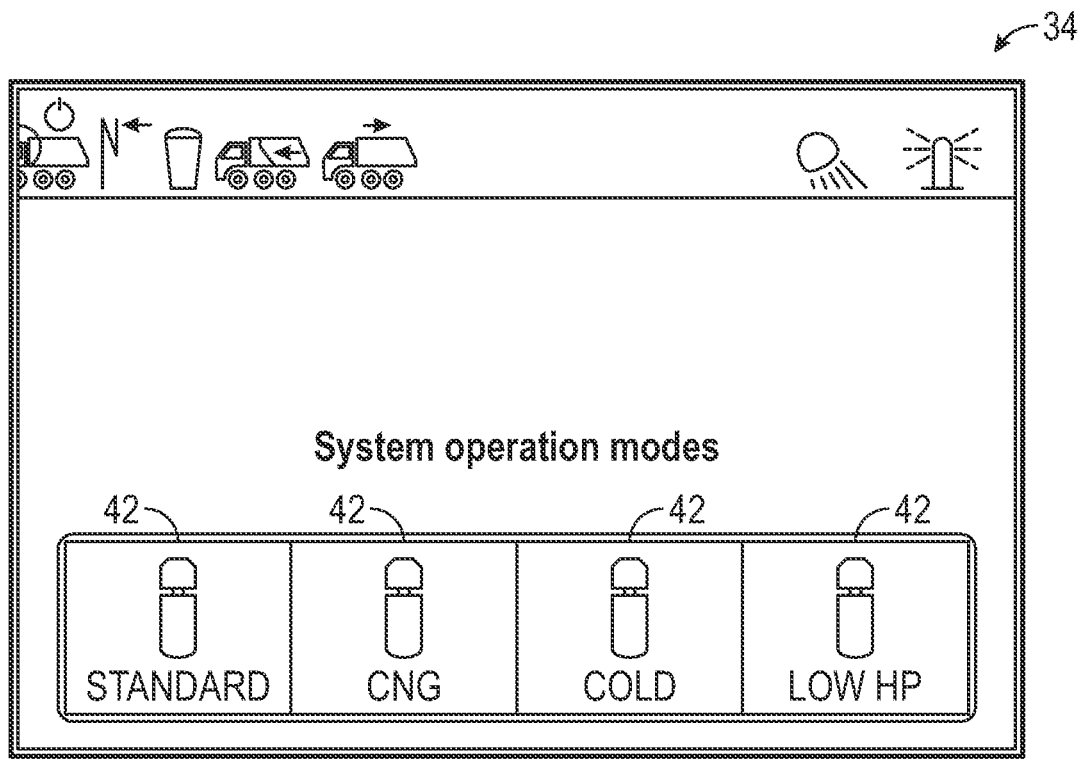
FIG. 3C is a detail view of the graphical user interface of FIG. 2, depicting exemplary operational presets related to overall vehicle system performance.

The GUI 34 can also display several different system operation modes that may advantageously activate or modify the operation of different vehicle subsystems 44 to optimize vehicle 10 performance. As shown in FIGS. 2 and 3C, an array of selectable inputs 42 can be presented on the display 32 that correspond with conditions the vehicle 10 may need to operate under. For example, the vehicle 10 may need to accommodate for specific performance parameters including hydraulic fluid temperature, transmission type, fuel type, ambient temperature, engine size, or other variable characteristics of a refuse vehicle 10. An operator can manually select an input on the GUI 34 to transition to a new operational mode or an operational mode can be automatically selected by the processing unit 30. For example, a temperature sensor 48 may be positioned on the vehicle 10 and may communicate temperature readings to the processing unit 30. If the detected temperature is below a threshold value (e.g., −10 degrees C.), the processing unit 30 can initiate a "cold" operation mode. In some embodiments, a remote fleet manager could select a suitable operation mode for the vehicle 10. In other embodiments, the refuse vehicle 10 can include one or more preset modes that correspond to accessories that can be used by the refuse vehicle 10 to perform a route.

Figure 7:
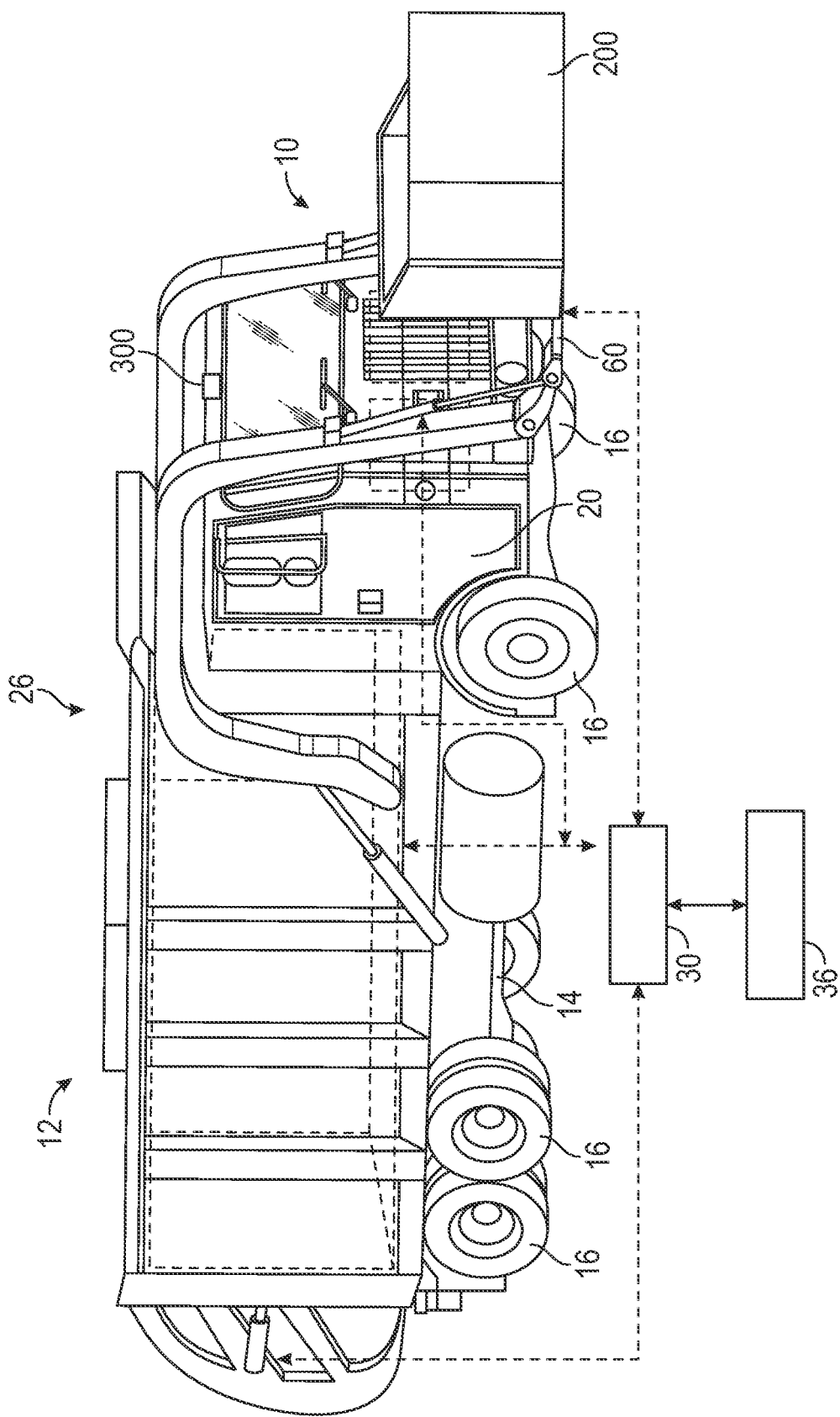
FIG. 7 is a perspective view of another refuse vehicle hauling a carry can assembly, according to an exemplary embodiment.

For example, and as depicted in FIGS. 7-8, the refuse vehicle 10 can support a refuse container assembly or carry can assembly 200, which can have its own preset operational modes. The carry can assembly 200 is configured to selectively couple with the forks 60 of a front loading refuse truck (e.g., the refuse trucks 10 shown in FIGS. 1 and 7), and can send or receive control signals that can be used to adjust the steering or direction of travel of the prime mover 20, for example. The carry can assembly 200 includes a container 202 and a refuse collection arm assembly 204. As shown in FIG. 8, the refuse container 202 within the carry can assembly 200 includes a series of walls 206 that cooperatively define an internal cavity or volume, shown as container refuse compartment 208. According to an exemplary embodiment, the container refuse compartment 208 is configured to receive refuse from the collection arm assembly 204.

The carry can assembly 200 includes an interface, shown as fork interface 220. The fork interface 220 includes a pair of interface portions, shown as fork interfaces 222, positioned along opposing walls 206. Each fork interface 222 defines a pocket, recess, chamber, or volume, shown as fork pocket 224. According to an exemplary embodiment, the fork pockets 224 are configured to receive the forks 60 of the refuse truck 10. The lift system 26 may thereby be configured to lift the carry can assembly 200 to empty the refuse within the container refuse compartment 208 of the refuse container into the receptacle 12 of the refuse vehicle 10. In other embodiments, the carry can assembly 200 is directly coupled to the lift arms 62 of the lifting system 26.

The collection arm assembly 204 is coupled to a rear wall 206 of the refuse container 202. The collection arm assembly 204 includes a first portion, shown as translatable portion 230, a second portion, shown as rotatable portion 240, and a third portion, shown as grabber assembly 250. The translatable portion 230 of the collection arm assembly 204 includes a carriage assembly, shown as slide track 232, a first actuator (e.g., pneumatic actuator, hydraulic actuator, electric actuator, etc.), shown as translation actuator 234, and a slideable member, shown as slide assembly 236. As shown in FIG. 8, the slide track 232 is coupled (e.g., fastened, welded, etc.) to the rear wall 206 of the refuse container 202. According to an exemplary embodiment, the slide assembly 236 is slidably coupled to the slide track 232. The translation actuator 234 is positioned to facilitate selectively extending and retracting the slide assembly 236 relative to the slide track 232 such that the grabber assembly 250 of the collection arm assembly 204 may extend laterally outward from the refuse container and retract laterally inward toward the refuse container 202, according to an exemplary embodiment.

The rotatable portion 240 of the collection arm assembly 204 includes an arm, shown as rotatable arm 242, and a second actuator (e.g., pneumatic actuator, hydraulic actuator, electric actuator, etc.), shown as lift actuator 244. The rotatable arm 242 is pivotally coupled to the slide assembly 236 and rotates about a joint, shown as pivot 246, extending along a longitudinal axis. The grabber assembly 250 is coupled to an end of the rotatable arm 242 (e.g., opposite the pivot 246, etc.). Specifically, the grabber assembly 250 includes a pair of can interface members, shown as claws 252, that are pivotally coupled to the rotatable arm 242. A pair of third actuators (e.g., pneumatic actuators, hydraulic actuators, electric actuators, etc.), shown as grabbing actuators 254, are coupled to the rotatable arm 242 and the claws 252. The grabbing actuators 254 are configured to pivot the claws 252 about substantially vertical axes toward or away from one another to close or open the grabber assembly 250, respectively. According to an exemplary embodiment, the grabber assembly 250 is configured to selectively open and close to engage and release a refuse bin. The lift actuator 244 is positioned to facilitate selectively pivoting the rotatable arm 242 and the grabber assembly 250 about the pivot 246, according to an exemplary embodiment. The collection arm assembly 204 may thereby facilitate engaging a refuse bin (e.g., positioned at a curb of a driveway, etc.) to deposit refuse from the refuse bin into the container refuse compartment 208 of the refuse container 202. Various modifications can be made to the carry can assembly 200 as well, including the mounting interface. Various different possibilities are shown and described in detail within (i) U.S. Pat. No. 10,035,648, filed May 31, 2017, (ii) U.S. Pat. No. 10,351,340, filed Jul. 27, 2018, (iii) U.S. Pat. No. 10,513,392, filed May 16, 2019, and (iv) U.S. Patent Publication No. 2020/0087063, filed Nov. 21, 2019, all of which are incorporated herein by reference in their entireties.

In some examples, the refuse vehicle 10 includes a "carry can" preset operational mode that is configured to facilitate operation of the refuse vehicle 10 in concert with the carry can assembly 200. As depicted in FIGS. 7-8, selecting the "carry can" mode on the GUI 34 can cause the processing unit 30 to institute a series of steps that are designed to couple the carry can assembly 200 to the refuse vehicle 10 and then operate the carry can assembly 200. As shown in FIGS. 7-8, a carry can assembly 200 can be coupled with the refuse vehicle 10 using the forks 60. Selecting the "carry can" preset operational mode on the GUI 34 can first adjust a position and height of the forks 60 to help facilitate the coupling process. For example, the memory 36 can store a specific fork spacing (e.g., a distance between the forks 60) that is suitable for a carry can assembly. Upon selecting the "carry can" mode, the forks 60 can be moved laterally to an appropriate position. In other examples, a tilt angle of the forks 60 can be adjusted to accommodate and/or facilitate coupling and securing the forks 60 to the carry can assembly 200. In still other examples, selecting the preset "carry can" mode initiates or activates optical sensors that communicate with the processing unit 30 to adjust a position of the refuse vehicle 10 so that the fork 60 positioning is aligned with the fork pockets 224 in the carry can assembly 200 that are configured to receive the forks 60. The processing unit 30 can accordingly carry out an automatic coupling process with the carry can assembly 200.

In addition to facilitating the coupling process with the carry can assembly 200, the processing unit 30 can also store preset operational modes for the carry can assembly 200 itself. For example, when the carry can mode is activated and the carry can assembly 200 is secured to the forks 60, the GUI 34 can prompt a user to select a type of refuse being collected and/or a type of route being performed. Once again, a selection of different items, such as "residential," "commercial," "industrial," or other types of routes, as well as "garbage," "recycling," "compost," or the like can be requested by the GUI 34 (or automatically selected using geo-fencing and route recognition). The selection of route type and waste type can influence the type and/or build of refuse receptacles expected, which can impact the positioning and clamping force of the grabber assembly 250 on the carry can assembly 200. Similar to the processes discussed above, the processing unit 30 can access and execute different operational parameters from the memory 36 for each selection made. As discussed above, "residential recycling" may be associated with a lower claw clamping force and a narrower claw position than "commercial waste," for example, based upon the type of expected receptacle to be emptied. The processing unit 30 can communicate with and directly control the grabber assembly 250 and the carry can assembly 200, generally, or can communicate with a second processing unit that is present upon the carry can assembly 200, which has access to its own on-board memory that has each of the different operational parameters stored according to the different preset operational modes.

In still other examples, various types of sensors can be used to perform a hybrid refuse collection approach. For example, one or more sensors 300 can be positioned along one of the refuse vehicle 10 and/or the carry can assembly 200 to scan for refuse receptacles. The sensors 300 can be configured to identify a specific type (e.g., garbage v. recycling, residential v. commercial) of refuse container and relay (e.g., transmit, etc.) the identified type of refuse container to the processing unit 30. Based upon this indication of refuse container type, the processing unit can execute multiple different preset operational modes in an on-demand basis. Accordingly, if the sensors initially detect a residential garbage can, the processing unit 30 can control the lifting system 26 to operate according to the jaw force and positioning parameters associated with both the "residential" and "garbage" collection modes. If, at the next stop, the sensors 300 detect a commercial recycling can or dumpster, the processing unit 30 can control the lifting system 26 to operate according to the jaw force and positioning parameters associated with both the "commercial" and "recycling" collection modes, which are different than the "residential" and "garbage" modes. For example, the commercial recycling mode can be associated with wider jaw positioning and higher jaw clamping forces to secure and empty the heavier-duty refuse containers.

Different operation modes can also be provided for each possible type of fuel that can power the refuse vehicle 10. For example, the GUI 34 can present selectable inputs for "standard," "CNG," "electric," or other suitable fuel sources. The standard input can correspond with a standard-sized diesel fuel engine that is operating within an acceptable range of ambient temperatures. In the standard mode of operation stored within the memory 36, performance parameters related to vehicle subsystems 44 can be adjusted so that all subsystems 44 are operational. The vehicle 10, lift system 26, motor 24, and compactor 46 can all be provided with full power to exhibit peak performance. Vehicle subsystems 44 do not require a throttle advance in this mode.

Some refuse vehicles 10 can be configured to run on compressed natural gas (CNG) as well, and can have a dedicated operational mode for this alternative fuel source. The GUI 34 can provide a selectable "CNG" input that can be implemented by the processing unit 30. The processing unit 30 can be in communication with the motor 24, a fuel pump or injector (not shown), and/or the fuel source itself to transition the motor 24 from receiving diesel fuel over to a mixture of diesel and CNG, or CNG alone. Beyond the motor 24 and fuel supply, other performance parameters of the vehicle may be adjusted to optimize the vehicle 10 for operating with alternative fuel sources. Ramping may be applied to certain functions of the vehicle to accommodate the process of how the motor 24 handles fuel. Because CNG engines are slower to respond to changes in engine load (e.g., throttle input), overshoot and stalling conditions may occur under normal operating conditions. The processing unit 30 can automatically execute a throttle advance to perform functions that may require an increase in torque. For example, the amount of CNG supplied to the motor 24 can be increased before and during the process of opening and closing the tailgate 58 of the vehicle 10. In some examples, one or more of the vehicle subsystems 44 are operated below rated capacity when the vehicle 10 is in the CNG operational mode. For example, one or more hydraulic fluid pumps can be deactivated to accommodate for the lower torque available from the motor 24. The processing unit 30 can increase the idle rotational speed of the engine to help provide additional torque while the vehicle is stationary. In some examples, the CNG operational mode can be used to provide rotational power to an external shaft or implement. A power take-off (PTO) shaft (not shown) can be controlled using the GUI 34 and processing unit 30 in the CNG mode.

Like the CNG operational mode, the "cold" mode can include modified performance parameters arranged to operate the refuse vehicle 10 at less than full capacity. For example, when the refuse vehicle 10 is being operated in ambient temperatures at or below 0 degrees C., certain vehicle subsystems 44 may be limited or otherwise reassigned. Function settings, ramps, and/or pump operation can be limited. Certain subsystems 44 can be dead-headed to produce heat that can be used to help the pumps or other hydraulics properly operate. In some embodiments, heaters (not shown) may be positioned about the vehicle 10 to supply heat to various locations within the hydraulic fluid flow path or within the hydraulic fluid reservoir. Sensors 48 within the hydraulic fluid reservoir can monitor the temperature of the hydraulic fluid contained within the reservoir, and can communicate with the processing unit 30 to operate the heaters (or dead head other functions to provide heat) when a detected hydraulic fluid temperature is below a threshold value. In some embodiments, the cold operational mode can be initiated by the processing unit 30 automatically when sensors detect hydraulic fluid temperature below a set threshold value or ambient temperature below a set threshold value.

The GUI 34 can also display a selectable icon for a low horsepower or "low HP" mode. The low horsepower mode can include performance parameters that are optimized to operate the vehicle 10 when the engine is capable of producing less than maximum power. Various factors may contribute to vehicle performance, including engine size and transmission type. With less available power, one or more of the vehicle subsystems 44 can be operated below rated capacity. Like the CNG mode, one or more hydraulic fluid pumps can be deactivated to accommodate for the lower torque available from the motor 24. The processing unit 30 can increase the idle rotational speed of the engine to help provide additional torque while the vehicle is stationary. The low horsepower operational mode can also be used to provide rotational power to an external shaft or implement. A PTO shaft (not shown) can also be controlled using the GUI 34 and processing unit 30 in the low horsepower mode.

Figure 4:
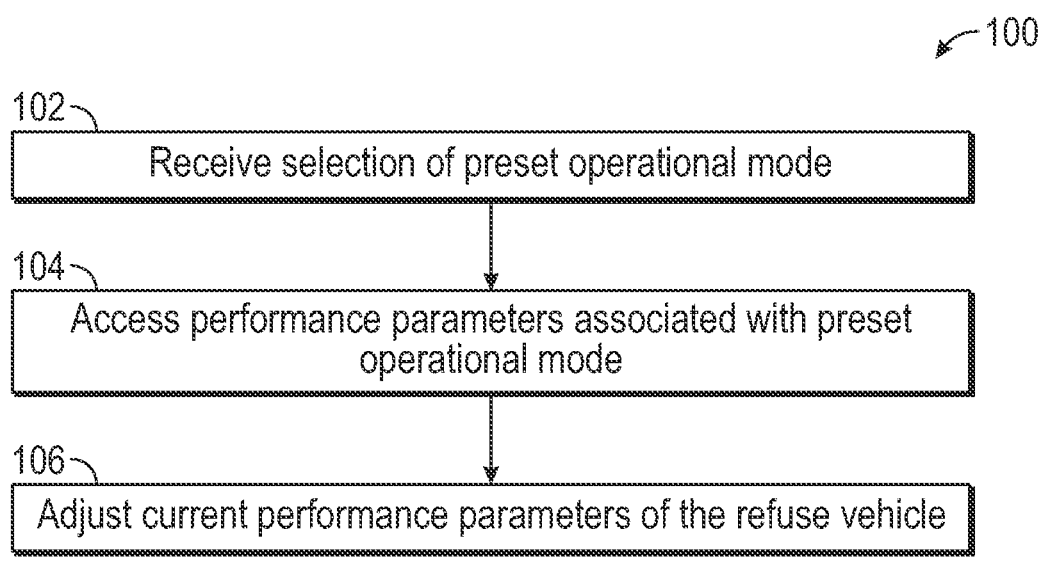
FIG. 4 is a process diagram of a method for controlling a refuse vehicle, according to an exemplary embodiment.

A method 100 of controlling a refuse vehicle 10 can be performed using the GUI 34 or other human-machine interface and processing unit 30, as detailed in FIG. 4. At step 102, a processing unit like the processing unit 30 can receive a selection of a preset operational mode. The selection of a preset operational mode can be made by an operator within the vehicle 10, automatically based upon detected vehicle parameters (e.g., temperature, fuel source, engine size, vehicle location or detected route), or remotely. For example, a fleet command center can provide instructions, including a preset operational mode, to each refuse vehicle 10 within its command.

Alternatively, the selection of a preset operational mode at step 102 can be generated by the processing unit 30. The processing unit 30 can be in communication with an onboard GPS. The GPS, which can be included within the sensors 48 of the control system 28, monitors the location of the refuse vehicle 10 as the vehicle 10 travels. The memory 36 can store a variety of different geographical indicators, such as "checkpoints" or geo-fences, which can be periodically compared with the current location of the refuse vehicle 10. If the refuse vehicle 10 crosses a stored geo-fence or reaches a checkpoint, for example, the processing unit 30 can transition the refuse vehicle 10 into a different operational mode. When the truck initially leaves to travel along a route, the processing unit 30 can compare the location of the refuse vehicle 10 to route maps or data stored within the memory 36. If the processing unit 30 determines that the location of the refuse vehicle 10 (or the recent path traveled by the refuse vehicle 10) matches a stored map location or route within the memory 36, the processing unit 30 can generate a selection to transition the refuse vehicle 10 to a different operational mode. For example, if the refuse vehicle 10 travels along a stored pick-up route for a predetermined distance (e.g., 800 meters), the processing unit 30 recognizes that the refuse vehicle 10 is traveling along a stored residential route and issues a selection of the residential operation mode. Alternatively, if the refuse vehicle 10 travels a predetermined distance (e.g., 1600 meters) without recognizing a stored checkpoint or pick-up route, the processing unit 30 can automatically select the commercial operation mode. Geo-fences can be positioned around residential areas, for example, which cause the processing unit 30 to select the residential operation mode whenever the refuse vehicle 10 passes beyond the geo-fence. The same route-recognition by the processing unit 30 and GPS can be applied to recycling and garbage modes as well.

At step 104, the processing unit can access performance parameters associated with the selected preset operational mode. As discussed previously, each preset operational mode optimizes the refuse vehicle 10 in a different way, based upon the tasks to be accomplished, the surrounding environmental conditions, or motor operation. The optimized performance parameters for each operational mode can be stored within a memory (e.g., memory 36) that can be accessed by the processing unit. The memory can be local or remote (e.g., cloud-based or network-based). The performance parameters may include packer frequency and pressure/force, hydraulic pump operation, heater operation, receptacle top door operation, lift system 26 operation, vehicle subsystem operational levels and operational logic, sensor operation, and/or performance of other controllable or variable components on a refuse vehicle.

At step 106, the processing unit adjusts current performance parameters of the refuse vehicle to match the performance parameters accessed at step 104. Adjusting the performance parameters of the vehicle to correspond with the values stored within the memory places the refuse vehicle in the selected preset operational mode chosen at step 102. A GUI or other HMI can display additional options related to the selected operational mode or data sensed or otherwise received during operation of the refuse vehicle within the selected operational mode, for example. The refuse vehicle is then optimized to perform a specific task or perform within a specific set of operational constraints.

Figure 5:
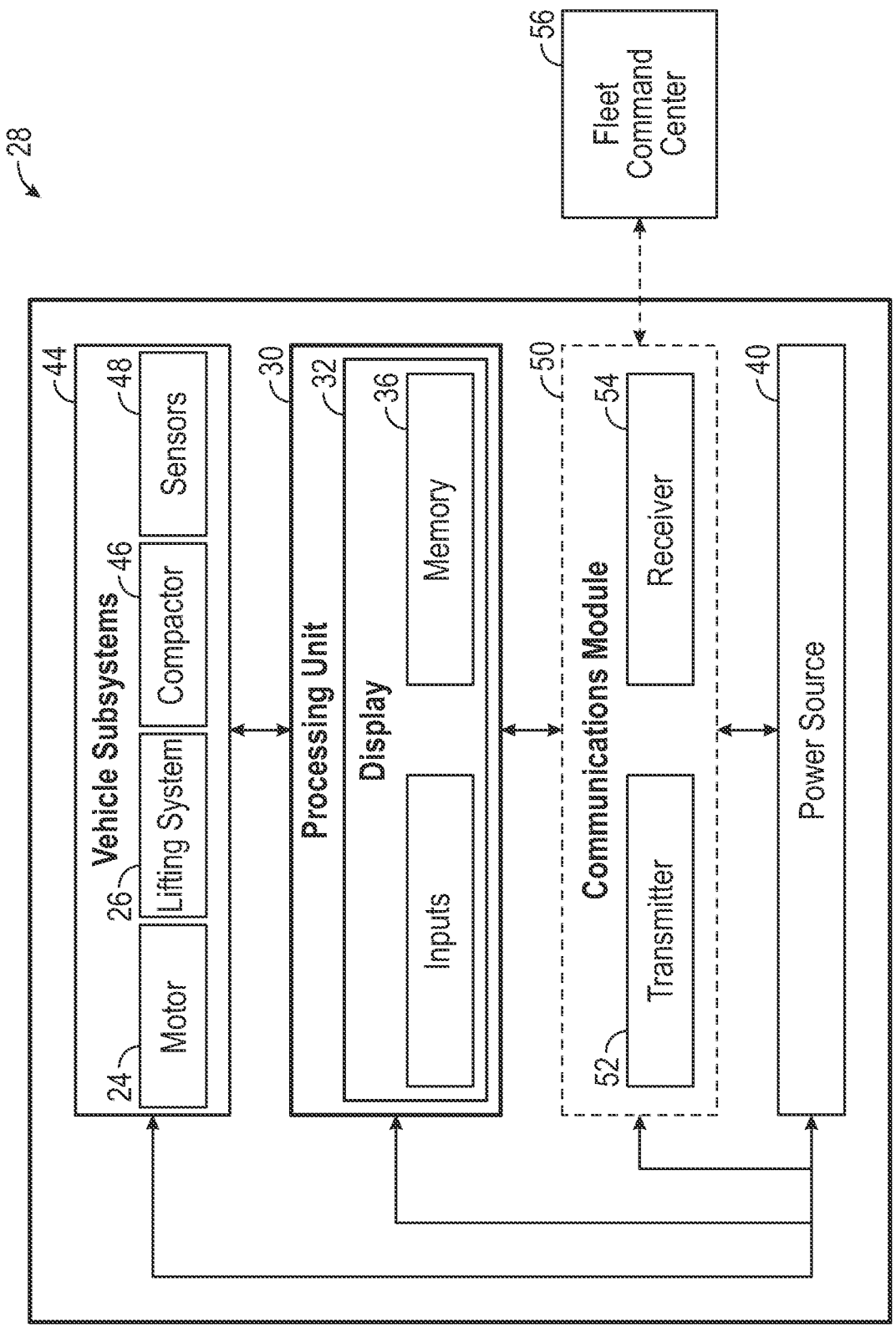
FIG. 5 is a schematic diagram of components that can be incorporated into a refuse vehicle, according to an exemplary embodiment.

The control system 28 can be organized as shown in FIG. 5. An on-board power source 40 (e.g., a battery) can provide electrical power to each of the components within the control system 28. As discussed previously, the control system 28 includes a processing unit 30. The processing unit 30 can be coupled to the display 32 to present the GUI 34. Inputs 42 in communication with the display 32 and processing unit 30 can be used to interact with the GUI 34. Alternatively, an HMI can provide a number of buttons that can be pressed to execute the different operational modes. Memory 36 can be stored on-board the vehicle 10 or remotely, but is in communication with and accessible by the processing unit 28.

The processing unit 28 issues commands and instructions to the vehicle subsystems 44 positioned about the vehicle. The vehicle subsystems 44 may include the motor 24, the lifting system 26, the compactor 46, sensors 48 positioned about the refuse vehicle 10, or other suitably controlled aspects of the refuse vehicle 10. Each subsystem 44 can be powered by the power source 40 and operated using the inputs 42, which may include a steering wheel, throttle, joystick, buttons, or the like. In other examples, other power sources are used by the different subsystems. For example, the prime mover 20 and/or hydraulic pumps can provide different types of power to different subsystems. In some embodiments, the prime mover 20 drives a hydraulic pump that operates the lifting system 26. In still other embodiments, the power source 40 supplies electrical power to the hydraulic pump, which in turn supplies pressurized hydraulic fluid to operate the various components within the lifting system 26.

In some embodiments, the control system 28 includes a communications module 50 to send and receive data from an external source. For example, the communications module 50 may include a transmitter 52 that can communicate with an external computer (e.g., a fleet command center 56) or a network to send data related to the vehicle operational modes or performance. The communications module 50 can further include a receiver 54 that can communicate with an external computer or network to receive instructions, data, updated operational modes and performance parameters, and other data that may advantageously be used to operate the refuse vehicle 10. Using the communications module 50, a refuse vehicle 10 can be remotely controlled or monitored to ensure optimized performance is occurring.

Using the above-described systems and methods, a refuse vehicle 10 can be optimized for performance to accomplish several different types of tasks effectively. Specifically, the lifting system 26 (e.g., the forks 60, the hydraulic arm assembly 110, grabber system 250) can be optimized to operate based upon the expected and/or detected type of refuse receptacle being emptied. The different operational modes used can correspond to route types, refuse types, detected conditions, or other suitable parameters. As discussed above, the control system 28 is configured to be able to transition between preset operational modes using both manual input (e.g., interaction with the HMI) or automatically (e.g., based upon detected travel route, day, etc.). In some examples, the control system 28 and the processing unit 30, more specifically, can be configured by a user to specifically accommodate different containers and/or routes.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, comprising:
a chassis supporting a plurality of wheels;
a vehicle body supported by the chassis and defining a receptacle for storing refuse therein;
a lifting system configured to engage and lift refuse containers to transfer refuse within the refuse containers into the receptacle, wherein the lifting system is operated with a hydraulic system;
a processing unit in communication with the lifting system and configured to access and execute a plurality of preset operational modes stored within a memory to adjust performance parameters of the lifting system, wherein the preset operational modes include at least two different operational modes corresponding to different route types; and
a human machine interface in communication with the processing unit and including a plurality of inputs, wherein at least two of the plurality of inputs correspond to the two different preset operational modes, the at least two different operational modes corresponding to at least one of (i) different route types including at least a residential mode and a commercial mode, or (ii) different route types including at least a recycling mode and a garbage mode;
wherein upon receiving a selection of one of the plurality of inputs on the human machine interface, the processing unit adjusts the performance parameters of the lifting system toward values associated with a preset operational mode that is associated with the at least one of the plurality of inputs selected.

2. The refuse vehicle of claim 1, wherein when the refuse vehicle is in the residential mode, the processing unit controls the lifting system to operate at a first grip force, and wherein when the refuse vehicle is in the commercial mode, the processing unit controls the lifting system to operate at a second grip force greater than the first grip force.

3. The refuse vehicle of claim 1, wherein when the refuse vehicle is in the recycling mode, the processing unit controls the lifting system to operate at a first grip force, and wherein when the refuse vehicle is in the garbage mode, the processing unit controls the lifting system to operate at a second grip force different than the first grip force.

4. The refuse vehicle of claim 1, wherein the lifting system is a hydraulic arm assembly.

5. The refuse vehicle of claim 4, wherein the performance parameters of the lifting system adjusted based upon the selection of the preset operational mode include at least a positioning of a set of jaws within the hydraulic arm assembly and a clamping force of the set of jaws within the hydraulic arm assembly.

6. The refuse vehicle of claim 4, further comprising a carry can assembly supported by one of the chassis or the vehicle body, and wherein at least a portion of the hydraulic arm assembly is incorporated into a carry can assembly.

7. The refuse vehicle of claim 1, wherein the lifting system is a set of forks, and wherein a positioning of the forks is adjustable based upon the selection of the preset operational mode.

8. The refuse vehicle of claim 1, wherein the human machine interface is a graphical user interface presented on a display.

9. The refuse vehicle of claim 8, wherein the plurality of inputs are presented on the graphical user interface, wherein the display is a touch screen.

10. A refuse vehicle, comprising:
a chassis supporting a plurality of wheels;
a vehicle body supported by the chassis and defining a receptacle for storing refuse therein;
a lifting system configured to engage and lift refuse containers to transfer refuse within the refuse containers into the receptacle;
a processing unit in communication with the lifting system and configured to access and execute a plurality of preset operational modes stored within a memory to adjust performance parameters of the lifting system, wherein the operational modes include at least two different operational modes corresponding to different route types including at least one of a residential route, a commercial route, an industrial route, a recycling route, or a garbage route, and wherein in response to receiving a selection corresponding with the route type the processing unit is configured to access one of the plurality of preset operational modes and to adjust the performance parameters of the lifting system toward values associated with the preset operational mode associated with the route type.

11. The refuse vehicle of claim 10, wherein a plurality of inputs corresponding to different route types are accessible from a human machine interface within a cab of the vehicle body, and the selection corresponding with the route type is input by a user interacting with at least one of the plurality of inputs.

12. The refuse vehicle of claim 10, wherein the selection corresponding with the route type is generated by the processing unit in response to receiving a signal from a global positioning system indicating that the refuse vehicle is positioned in a location that is associated with the route type.

13. The refuse vehicle of claim 10, wherein the selection corresponding with the route type is generated by the processing unit in response to receiving a signal from a sensor on the refuse vehicle, wherein the sensor is configured to detect characteristics of a refuse container.

14. The refuse vehicle of claim 13, wherein the characteristics of a refuse container detected by the sensor include one of a size or a color of the refuse container.

15. The refuse vehicle of claim 10, wherein the performance parameters of the lifting system adjustable by the processing unit include at least a clamping force and a jaw positioning for a hydraulic arm assembly.

16. A refuse vehicle, comprising:
a chassis;
a vehicle body supported by the chassis and defining a receptacle for storing refuse therein;
a hydraulically-driven lifting system configured to engage and lift a waste container to transfer refuse within the waste container into the receptacle; and
a processing unit in communication with the hydraulically-driven lifting system and configured to access and execute a plurality of preset operational modes stored within a memory to adjust performance of the hydraulically-driven lift system based upon a selection corresponding to a refuse type, the preset operational modes including a residential route and an industrial route, the preset operational mode for the residential route including a first gripping force of jaws of the hydraulically-driven lifting system that differs from a second gripping force of jaws of the hydraulically-driven lifting system that is associated with the preset operational mode for the industrial route.

* * * * *